(12) United States Patent
Perbandt

(10) Patent No.: US 9,302,222 B2
(45) Date of Patent: Apr. 5, 2016

(54) PROCESS FOR REDUCING THE NITROGEN OXIDE OFF-GAS CONCENTRATION IN A NITRIC ACID PLANT DURING SHUT-DOWN AND/OR START-UP, AND NITRIC ACID PLANT SUITABLE THEREFOR

(71) Applicant: ThyssenKrupp Industrial Solutions AG, Essen (DE)

(72) Inventor: Christian Perbandt, Dortmund (DE)

(73) Assignee: THYSSENKRUPP INDUSTRIAL SOLUTIONS AG, Essen (DE)

( * ) Notice: Subject to any disclaimer, the term of this patent is extended or adjusted under 35 U.S.C. 154(b) by 0 days.

(21) Appl. No.: 14/403,149

(22) PCT Filed: May 2, 2013

(86) PCT No.: PCT/EP2013/001307
§ 371 (c)(1),
(2) Date: Nov. 21, 2014

(87) PCT Pub. No.: WO2013/174475
PCT Pub. Date: Nov. 28, 2013

(65) Prior Publication Data
US 2015/0098881 A1 Apr. 9, 2015

(30) Foreign Application Priority Data
May 22, 2012 (DE) .......................... 10 2012 010 017

(51) Int. Cl.
*C01B 21/38* (2006.01)
*C01B 21/40* (2006.01)
(Continued)

(52) U.S. Cl.
CPC .......... *B01D 53/869* (2013.01); *B01D 53/8625* (2013.01); *B01D 53/8631* (2013.01);
(Continued)

(58) Field of Classification Search
CPC ........ C01B 21/40; C01B 21/38; B01D 53/56; B01D 53/565; B01D 53/8625
See application file for complete search history.

(56) References Cited

U.S. PATENT DOCUMENTS

| 4,869,890 A | 9/1989 | Adams |
| 6,056,928 A * | 5/2000 | Fetzer .................... B01D 53/56 423/235 |

FOREIGN PATENT DOCUMENTS

| DE | 102010022775 A1 | 12/2011 |
| KR | 20140121844 A * | 10/2014 .............. C01B 21/26 |

(Continued)

OTHER PUBLICATIONS

German Language International Search Report for International patent application No. PCT/EP2013/001307; mailing date Oct. 7, 2013.

(Continued)

*Primary Examiner* — Timothy Vanoy
(74) *Attorney, Agent, or Firm* — ThyssenKrupp North America, Inc.

(57) ABSTRACT

Disclosed is a method and system for reducing the nitrogen oxide off-gas concentration in a nitric acid plant operated under pressure and equipped with a residual gas purification first reactor configured to remove nitrogen oxides from the off-gas during steady-state operation of the plant, and a second reactor configured to remove nitrogen oxides from the off-gas during a start-up and/or shut down of the plant. The method includes, during start-up and/or shut-down of the nitric acid plant, passing pressurized nitrogen-oxide-containing off-gas from the nitric acid plant and a gaseous reducing agent for the nitrogen oxides into the second reactor charged with a catalyst, to reduce the NOx content in the off-gas by at least catalytic reduction. Using the process and system, a colorless start-up and shut-down of nitric acid plants is possible and the nitrogen oxide content in the off-gas during start-up and/or shutdown can be substantially lowered.

17 Claims, 1 Drawing Sheet

(51) Int. Cl.
  *B01D 53/56* (2006.01)
  *B01D 53/86* (2006.01)
  *C01B 21/26* (2006.01)

(52) U.S. Cl.
  CPC ............... *C01B21/26* (2013.01); *C01B 21/40* (2013.01); *B01D 2251/204* (2013.01); *B01D 2251/208* (2013.01); *B01D 2251/2062* (2013.01); *B01D 2255/106* (2013.01); *B01D 2255/1021* (2013.01); *B01D 2255/1023* (2013.01); *B01D 2255/1025* (2013.01); *B01D 2255/207* (2013.01); *B01D 2255/50* (2013.01); *Y02C 20/10* (2013.01)

(56) References Cited

FOREIGN PATENT DOCUMENTS

| WO | 01/51182 A1 | 7/2001 | |
|---|---|---|---|
| WO | 03/078314 A1 | 9/2003 | |
| WO | WO 03078314 A1 * | 9/2003 | ............. B01D 53/56 |

OTHER PUBLICATIONS

English Translation of International Search Report for International patent application No. PCT/EP2013/001307; mailing date Oct. 7, 2013.

Connock L., "Tackling global warming", Nitrogen + Syngas, British Sulphur Publishing, London, GB, No. 295, Sep. 1, 2008, pp. 29-38, 40, XP001520983, ISSN: 1750-6891.

Behr, A., 2002. Ullmann's Encyclopedia of Industrial Chemistry, vol. 6, Wiley-VCH, Weinheim.

van den Brink, "Combined catalytic removal of NOx and N2O in a single reactor from the tail gas of a nitric acid plant," Report No. ECN—C-02-009 (Feb. 2002).

ThyssenKrupp Uhde company document, "Setting Emissions Standards for Nitric Acid Plants."

Dutch Notes on BAT for the Production of Nitric Acid, Final Report, Dec. 1999.

Atlas of Zeolite Structure Types, Elsevier, 4th revised Edition 1996.

English Language translation of abstract for DE 102010022775 A1, 2011.

* cited by examiner

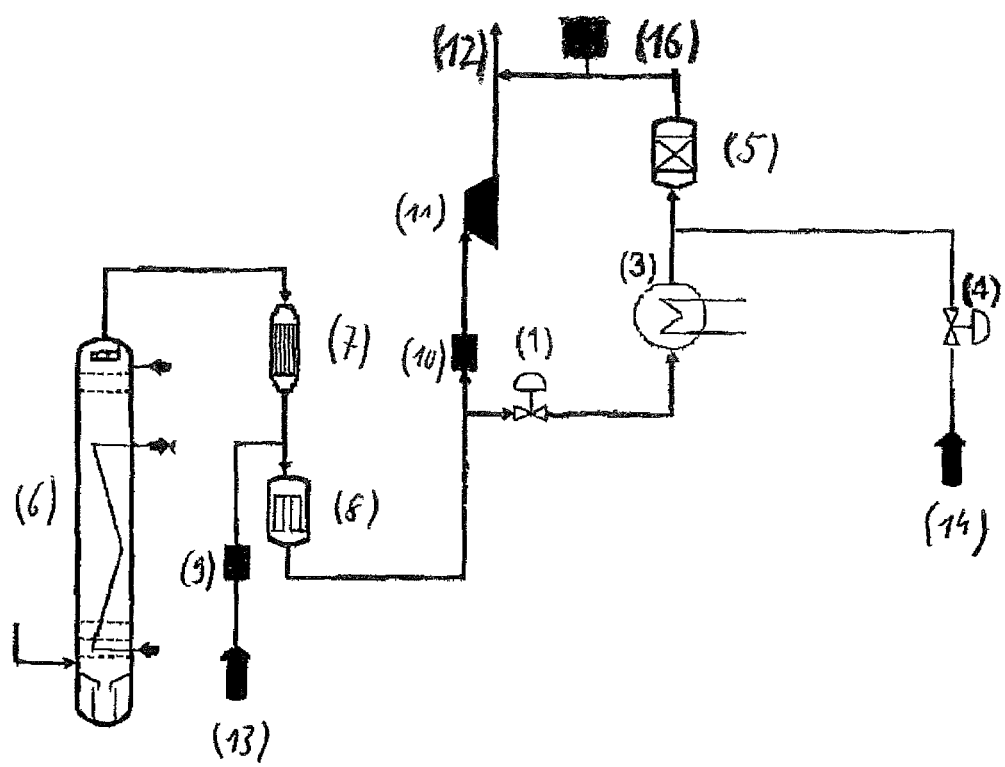

PROCESS FOR REDUCING THE NITROGEN OXIDE OFF-GAS CONCENTRATION IN A NITRIC ACID PLANT DURING SHUT-DOWN AND/OR START-UP, AND NITRIC ACID PLANT SUITABLE THEREFOR

CROSS REFERENCE TO RELATED APPLICATIONS

This application is a U.S. National Stage Entry of International Patent Application Serial Number PCT/EP2013/001307, filed May 2, 2013, which claims priority to German patent application no. 102012010017.5, filed May 22, 2012.

FIELD

The invention relates to a process for reducing the nitrogen oxide offgas concentration in a nitric acid plant operated under pressure, in the course of shutdown and/or startup of the plant. The invention also relates to a modified nitric acid plant with which this process can be operated.

BACKGROUND

For preparation of nitric acid, ammonia is generally first oxidized with air over a catalyst and nitrogen oxide NO is produced, which is oxidized later in the process to nitrogen dioxide $NO_2$ [Behr, A., 2002. Ullmann's Encyclopedia of Industrial Chemistry, Vol. 6, Wiley-VCH, Weinheim].

Subsequently, the nitrogen dioxide $NO_2$ thus obtained is absorbed in water to form nitric acid. In order that a maximum amount of the nitrogen dioxide $NO_2$ obtained is absorbed by water, the absorption is generally effected at elevated pressure, preferably at pressures between 4 and 14 bar.

The oxygen required for the conversion of the ammonia used as the raw material is generally supplied in the form of atmospheric oxygen. For the purpose of supply, the process air is compressed in a compressor and brought to a pressure appropriate both for the oxidation reaction and for the absorption reaction.

Modern nitric acid plants are operated under pressure in order to achieve higher acid concentrations and higher absorption rates of $NO_x$ (i.e. better efficiencies) in the absorption. A distinction is made between two-pressure and one-pressure plants. In the one-pressure process, both the combustion and the absorption are performed at moderate pressure (<8 bar) or high pressure (>8 bar).

In the two-pressure plants, the gas production, i.e. the production of the nitrous gases by oxidation of ammonia, is effected under a pressure of about 4 to 6 bar, and the absorption of the nitrous gases thus obtained with water to give nitric acid typically at 8 to 12 bar.

The pressure is generated using compressors which are driven by means of a gas and/or steam turbine or electric motor. A gas turbine is preferably operated with the offgas of the nitric acid plant using the pressure applied by the at least one compressor.

Modern nitric acid plants are equipped with residual gas cleaners in order to satisfy the ever stricter regulations regarding the $NO_x$ and $N_2O$ offgas emission. Offgas cleaners are now state of the art because the nitrogen oxides $NO_x$ are responsible, for example, for "acid rain" and the offgas constituent $N_2O$ (laughing gas) is one of the greenhouse gases. With the systems available on the market for offgas cleaning, it is possible to reliably comply with the current limits for $NO_x$ emissions in nitric acid production in steady-state operation of the plant.

Examples of residual gas cleaning for the steady-state operation of nitric acid plants are known from an article by van den Brink entitled "Combined catalytic removal of $NO_x$ and $N_2O$ in a single reactor from the tail gas of a nitric acid plant" from Report No. ECN-C-02-009 (February 2002) and from the ThyssenKrupp Uhde company document "Setting Emissions Standards for Nitric Acid Plants". None of these documents discloses measures which are taken in the course of startup and/or shutdown of a nitric acid plant in order to reduce the content of nitrogen oxides during this operation phase.

In contrast, in the course of non-steady-state startup and shutdown of the nitric acid plants, an elevated $NO_x$ concentration of, for example, >50 ppm in the residual gas currently arises in the outlet of the chimney unless additional measures for emission reduction are installed in the plant. The elevated $NO_x$ emissions become visible by a yellowish to deep brown color in the residual gas, according to the NO concentration at the outlet of the chimney. The higher the concentration, the darker and more intense the appearance of the color of the emerging gases. The elevated $NO_x$ concentrations in the residual gas in the exit of the chimney arise since the residual gas cleaning is normally not, or no longer, in operation when the nitric acid plant is started or when the nitric acid plant is not in operation. In addition, an elevated $NO_x$ concentration arises in the course of startup of the plant, since NO gases are still present in the plant, for example in pipelines, pipeline internals or other plant parts.

In contrast to steady-state operation, it is generally impossible at present in the course of the startup/shutdown operation of the nitric acid plants to avoid nitrogen oxide emissions which distinctly exceed the standard limits for a limited time. This involves emission of $NO_x$ predominantly as $NO_2$, which is visually perceptible to an increasing degree as a brown offgas above the chimney from about 20 ppm. These operating states have to date been the subject of relatively little consideration because they are comparatively rare compared to the steady-state operating mode and public interest was comparatively low. Due to the increasing environmental awareness of the public and the resulting emission laws, plant operators are now also increasingly demanding "reduced emissions" or "colorless" startup/shutdown.

In the course of startup from the switched-off/cold state, the nitric acid plant is first filled with air ("air operation") with the import of outside energy (for example outside steam or power). In the course of this, the offgas is heated to a temperature of about 165 to 200° C. at the inlet of the residual gas cleaning. The first $NO_x$ emissions arise as soon as the absorption tower, during the startup process, is filled with nitric acid from a reservoir vessel and the $NO_2$ gas present in the acid is stripped out/blown out by the air. Current residual gas cleaning operations in which ammonia is used as the reducing agent for the $NO_x$ cannot be put into permanent operation until a minimum temperature exceeding 200° C. for the purpose of avoiding the formation of ammonium nitrate on the catalyst and in the downstream plant system. Moreover, the degree of $NO_x$ oxidation present in the course of startup is unfavorable for the residual gas cleaning operation. Therefore, in current plants, the $NO_x$ gas formed during the filling operation is emitted. With the end of the filling operation, $NO_x$ emission also ceases at first until the $NH_3$ oxidation of the nitric acid plant is started ("ignited"). After the ignition, the temperature and $NO_x$ concentration in the plant rise constantly to the steady-state operating value, and the residual gas cleaning can be operated as planned from a temperature of about 200° C. From this operation point, the legally stipulated $NO_x$ emissions can be complied with.

Particularly the starting of the compressor set in the two-pressure process, high-pressure process and moderate pressure process and the starting of the ventilator in the atmospheric process have to be viewed critically, since the starting of the compressor set causes the first $NO_x$ emissions through the gas present in the plant at the exit of the chimney. This is the case particularly when the shutdown of the plant has been unplanned. The $NO_x$ emissions are caused firstly by $NO_x$ gases present in the plant system, and by outgassing $NO_x$ from the unbleached nitric acid in the absorption tower. $NO_x$ emissions resulting from outgassing $NO_x$ from the nitric acid are caused to a particularly high degree in the course of filling of the absorber with nitric acid shortly before the plant is started, since the acid is bleached by the air which is conveyed through the plant before the startup. Furthermore, considerable $NO_x$ concentrations are attained in the residual gas in the exit of the chimney after the plant has been started (ignition of the ammonia burner).

In the course of non-operation or in the course of shutdown of a nitric acid plant, the nitrogen oxides present under pressure in the plant, i.e. principally $NO_x$ (predominantly $NO_x$ and $NO_2$) and $N_2O$, are decompressed via the absorption column and the residual gas cleaning into the surrounding atmosphere. Since the residual gas cleaning can be kept in operation only for as long as permitted by the permissible limiting temperatures and hydrodynamic conditions, this cleaning is generally out of operation before the plant is completely decompressed. Furthermore, the absorption column, which is typically equipped with sieve trays, begins to become unstable with reduced gas flow, and so the absorption efficiency declines significantly. Experience has shown that, as soon as the residual gas cleaning is out of operation, the content of nitrogen oxides in the gas to be released to the atmosphere will increase significantly during the residual decompression, which will lead to the offgas becoming visible at the outlet of the chimney.

Therefore, solutions have already been sought, in which the nitrogen oxide offgas concentration in the course of shutdown and/or startup of a nitric acid plant can be reduced without the use of the conventional residual gas cleaning operation.

For reduction of the $NO_x$ offgas concentration in the course of shutdown and/or startup of a nitric acid plant, WO 03/078314 A1 proposes, in the course of shutdown of a nitric acid plant operated under pressure, after the residual gas cleaning has stopped, maintaining the pressure existing within the plant temporarily and then decompressing the gas in a regulated manner and releasing it to the environment diluted by means of air fed in from the outside. These measures can achieve regulated release of gases to the environment, these comprising $NO_x$ in sufficient dilution, such that it is possible to refer to colorless shutdown of the plant. In the course of restarting the plant, it is suggested that an elevated proportion of process air be supplied to the plant upstream of or beyond the residual gas turbine, such that the gas escaping from the plant has sufficient dilution of nitrous gases. A reduction in the content of nitrous gases emitted from the plant, however, is not achieved thereby. Moreover, the application of the process described in this document necessitates specific precautions within a nitric acid plant which would not be absolutely necessary for the "normal" operation of the plant. For example, it is necessary to install within the plant apparatuses which enable blocking-in, i.e. enclosure, of the gas present in the plant within the stoppage operation.

In the above-described process variant, the $NO_x$-laden offgas is diluted with air to such an extent that it is no longer visible at the exit of the chimney. In spite of this, the absolute amount of $NO_x$ emitted to the environment per startup operation is maintained. This procedure is increasingly being perceived as no longer acceptable by the operators of the plants and by the legislators. The result is an urgent desire also to be able to prevent the $NO_x$ emissions even in the startup and shutdown operations.

In Dutch Notes on BAT for the Production of Nitric Acid, Final Report, December 1999, measures are described to reduce the emission of nitrogen oxides in the course of operation of nitric acid plants. As well as measures for steady-state operation, measures in the course of startup and shutdown of such plants are also described. These involve increasing the absorption capacity of the absorption tower, and the injection of steam into the chimney. The aim of both measures is to absorb the $NO_x$ present to form nitric acid and to avoid the emission thereof into the environment. Further measures mentioned are the heating of the offgas during the startup or shutdown, or the installation of an SCR plant (=plant for selective catalytic reduction) active at low temperatures. The aim of both measures is to be able to operate the steady-state residual gas cleaning operation as early as possible or for as long as possible. Further measures mentioned are the installation of a trickle tower or the installation of a tower with dry absorbent. The aim of both measures is to absorb the nitrogen oxides present and thus to prevent the emission thereof into the environment. Disadvantages are the high capital costs associated with the abovementioned measures.

SUMMARY

It is an object of the present invention to provide a process for startup and/or shutdown of nitric acid plants, in which the amount of nitrogen oxide emissions is drastically reduced or even entirely suppressed. This process should also be realizable by simple measures.

It is a further object of the present invention to provide a nitric acid plant modified for the performance of the process according to the invention, in which only minor apparatus alterations to a conventional nitric acid plant are required.

BRIEF DESCRIPTION OF THE DRAWING

The present disclosure is described in detail below with reference to the attached drawing FIGURE, wherein:

FIG. 1 is simplified schematic diagram depicting an embodiment of a nitric acid plant having an additional reactor for use in the reduction of nitrogen oxide off-gas concentrations during the shutdown and/or startup of a nitric acid manufacturing plant, as disclosed herein.

DETAILED DESCRIPTION

The present invention relates to a process for reducing the nitrogen oxide offgas concentration in a nitric acid plant, operated under pressure and equipped with a reactor for residual gas cleaning, during the course of shutdown and/or startup of the plant. The reactor for residual gas cleaning is configured to remove nitrogen oxides from the offgas during steady-state operation. In the course of startup and/or shutdown of the nitric acid plant, a pressurized offgas containing nitrogen oxides from the nitrogen oxide plant and a gaseous reducing agent for the nitrogen oxides are directed into a catalyst-filled additional reactor that is provided in addition to the reactor for residual gas cleaning. The catalyst-filled additional reactor is configured to reduce the content of nitrogen oxides in the offgas during the shutdown and/or startup of the nitric acid plant. In the catalyst-filled additional reactor, the NO$_x$ content in the offgas is reduced by catalytic reduction, or wherein the NO$_x$ content in the offgas is reduced by catalytic reduction and the N$_2$O content in the offgas is reduced by at least one of catalytic reduction or catalytic decomposition in the additional reactor.

The inventive solution is characterized in that the content of nitrogen oxides in the offgas is reduced in an additional reactor (5) by means of reducing agent (14) during the decompression operation. It is thus possible to dispense with the dilution of the decompressed residual gas with air.

The additional reactor (5) preferably works by the SCR principle ("SCR"=selective catalytic reduction), and the dimensions thereof can generally be much smaller than those of the reactors for residual gas cleaning typically used for steady-state operation. The additional reactor (5) should advantageously be designed such that the reactor volume is reduced at least by a factor of 5 compared to the conventional reactor for residual gas cleaning (8), and the nitric acid plant can be decompressed within 2 to 4 hours.

The additional reactor (5) is charged with catalysts for degradation of NO$_x$ ("deNO$_x$ catalysts"). These catalysts are known to those skilled in the art. In general, these are transition metal catalysts which promote the chemical reaction of NO$_x$ with reducing agents. Preference is given to conventional deNO$_x$ catalysts, especially to those comprising transition metals and/or transition metal oxides, for example iron oxides, nickel oxides, copper oxides, cobalt oxides, manganese oxides, rhodium oxides, rhenium oxides or vanadium oxides, or metallic platinum, gold or palladium, or else mixtures of two or more of these compounds. Particular preference is given to catalysts based on V$_2$O$_5$—TiO$_2$.

Preference is also given to using zeolite catalysts laden with transition metals in the deNO$_x$ reactor used in accordance with the invention. These are preferably zeolites selected from the group of the MFI, BEA, FER, MOR and MEL types or mixtures thereof, preferably of the BEA or MFI type, more preferably a ZSM-5 zeolite.

Specific details regarding the formation or structure of the zeolites used with preference in accordance with the invention are given in the Atlas of Zeolite Structure Types, Elsevier, 4th revised Edition 1996, to which explicit reference is hereby made.

The process according to the invention also includes the use of those zeolites in which the lattice aluminum has been partly replaced by one or more elements selected from B, Be, Ga, Fe, Cr, V, As, Sb and Bi. Likewise included is the use of zeolites in which the lattice silicon has been substituted in an isomorphous manner by one or more elements, for example by one or more elements selected from Ge, Ti, Zr and Hf.

Catalysts used in accordance with the invention typically contain further additives known to those skilled in the art, for example binders, for example aluminosilicates or boehmite.

The catalyst may be present in the form of shaped bodies of any size and geometry, preferably in geometries which have a relatively large ratio of surface to volume and for which through-flow generates a minimum pressure drop.

Typical geometries are all of those known in catalysis, for example cylinders, hollow cylinders, multihole cylinders, rings, crushed pellets, trilobes or honeycomb structures.

The metal content of the transition metal-containing zeolite used with preference in the deNO$_x$ reactor may, based on the mass of zeolite, vary within wide ranges, and may, for example, be up to 25%, but preferably 0.1 to 10% and especially 2 to 7%.

As well as the deNO$_x$ catalysts which catalyze the chemical reaction of the NO$_x$ with reducing agents, the additional reactor (5) may also comprise catalysts which promote the chemical decomposition of N$_2$O to nitrogen and oxygen or the chemical reduction of N$_2$O and reducing agent. These catalysts are likewise known to those skilled in the art. Some of the catalysts which are used for the chemical conversion of the NO$_x$ with reducing agents are also simultaneously suitable for the chemical decomposition of N$_2$O to nitrogen and oxygen and/or for the chemical reduction of N$_2$O with reducing agents.

The catalysts may be present in the additional reactor (5) in all arrangements known to those skilled in the art. These may include beds of finely divided catalyst material of any geometry, such that one or more catalyst beds are formed. The catalysts may also be present in honeycomb form in the additional reactor (5).

Also introduced into the additional reactor (5), as well as the offgas comprising nitrogen oxides, are reducing agents (14) for nitrogen oxides, especially reducing agents for NO$_x$.

The reducing agent (14) can be introduced into the offgas stream upstream of the additional reactor (5) or as far as directly upstream of the catalyst bed in the additional reactor (5). A suitable reducing agent (14) for NO$_x$ is any substance which is known to those skilled in the art and has a high activity for reduction of NO$_x$. These may be, for example, nitrogen-containing reducing agents. The nitrogen-containing reducing agents employed may be any compounds, provided that they are suitable for reduction of NO$_x$. Examples are azanes, hydroxyl derivatives of azanes, and also amines, oximes, carbamates, urea or urea derivatives. Examples of azanes are hydrazine and very particularly ammonia. One example of a hydroxyl derivative of azanes is hydroxylamine. Examples of amines are primary aliphatic amines such as methylamine. One example of carbamates is ammonium carbamate. Examples of urea derivatives are N,N'-substituted ureas such as N,N'-dimethylurea. Urea and urea derivatives are preferably used in the form of aqueous solutions.

Particular preference is given to using ammonia as the reducing agent (14) for nitrogen oxides, especially for NO$_x$.

In addition to the reducing agent for NO$_x$, a reducing agent for N$_2$O can also be introduced into the gas stream to be treated. This reducing agent may be a nitrogen-containing reducing agent. Examples thereof are listed above. However, this reducing agent may also comprise gaseous hydrocarbons, carbon monoxide or hydrogen. Particular preference is given to using ammonia as the reducing agent for N$_2$O.

The reducing agent is added in such amounts as required for reduction of the NO and the N$_2$O to the desired degree. The aim is a reduction in the NO content by >80%, preferably >90%, even more preferably >95%, especially between 95% and 100%, and a reduction in the N$_2$O content by >20%, preferably >50%, even more preferably >70%, especially between 80% and 100%. The amounts of reducing agent required for that purpose depend on the nature of the reducing agent and can be determined by the person skilled in the art by routine experiments.

The method of introduction of reducing agent(s) into the gas stream to be treated can be configured freely within the context of the invention. The reducing agent can be introduced in the form of a gas or else of a liquid or aqueous solution which vaporizes in the gas stream to be treated. Feeding into the gas stream to be treated is effected by means of a suitable introduction device, for example by means of a corresponding pressure valve or by means of correspondingly configured nozzles. Preferably, a mixer may be provided downstream of the introduction device in the conduit for the gas stream to be treated, and this promotes the mixing of the gas stream to be cleaned with the reducing agent supplied. In the case of use of various reducing agents, supply and introduction into the gas to be cleaned can be effected separately or together.

In a preferred embodiment of the process according to the invention, the content of nitrogen oxides in the offgas stream during the startup and/or shutdown is determined by a measurement device (16) upstream or downstream of the additional reactor (5) and the measurement serves as a control parameter for the regulation of the amount of reducing agent (14) which is added to the offgas stream.

The temperature in the additional reactor (5), at least during the startup and/or shutdown of the nitric acid plant, varies in the range from 100 to 600° C.

In steady-state operation of the plant, the additional reactor (5) can be put out of operation, in which case the offgas stream generally bypasses the additional reactor (5). However, there are also conceivable embodiments in which the offgas stream in steady-state operation is run through the additional reactor (5) and reducing agent for nitrogen oxides is optionally introduced into the additional reactor (5), such that, as well as conventional residual gas cleaning, in the additional reactor an additional reduction in the content of nitrogen oxides is effected in a substream of the offgas.

In a preferred embodiment of the process according to the invention, the offgas stream from the nitric acid plant in the course of startup and/or shutdown of the plant bypasses the residual gas turbine (11) and is instead sent through an additional reactor (5) connected in parallel to the residual gas turbine (11), and the offgas, after flowing through the additional reactor (5) and after reducing the content of nitrogen oxides, is sent to the chimney (12). The switching of the offgas stream between the startup and shutdown phase and steady-state operation can be effected by valves (1, 10). These can be operated manually or preferably automatically.

The pressure in the additional reactor (5), at least during the startup and/or shutdown of the plant, varies in the range from 0.9 to 3 bar, preferably in the range from 0.9 to 1.5 bar.

The additional reactor (5) is preferably filled with catalyst such that—based on the entering gas stream—the result in each case, at least during the startup and/or shutdown of the plant, is a space velocity which, with the given temperature and pressure values in this reactor, brings about a reduction in the $NO_x$ content present at the inlet of the reactor of at least 80%. Typical space velocities in the additional reactor vary within the range between 2000 and 200 000 $h^{-1}$, preferably between 5000 and 100 000 $h^{-1}$ and more preferably between 10 000 and 50 000 $h^{-1}$. The space velocity can be adjusted via the volume flow rate of the gas and/or via the amount of catalyst.

The crucial difference in the inventive solution from systems for residual gas cleaning used to date is that of size. Typically, the volume of the additional reactor (5), based on the volume, is much less than the volume of a corresponding offgas cleaning system or offgas cleaning reactor used to date. The reactor volumes of conventional residual gas cleaning plants, according to the plant size, vary in the range from 2 to 20 $m^3$. By comparison, the volume of an additional reactor (5) is much reduced, for example smaller by a factor of 2 to 200, compared to the volume of corresponding offgas cleaning systems or offgas cleaning reactors used to date. The volume of the additional reactor (5) preferably varies in the range from 0.01 $m^3$ to 10 $m^3$, more preferably in the range from 0.01 $m^3$ to 5 $m^3$ and most preferably in the range from 0.05 $m^3$ to 1 $m^3$. Existing residual gas cleaning systems, for example for the removal of $NO_x$ and of $N_2O$ from the offgas, are designed for the steady-state operation of the plant and can no longer be operated reliably due to the reduced volume flow rate in the decompression operation, because the function-critical hydrodynamics of the reactor can no longer be ensured. Furthermore, after the plant has been shut down, there is no way in the existing residual gas cleaning systems of heating the offgas to the necessary reaction temperature during the decompression operation. In the additional reactor (5) used in accordance with the invention, it is possible in a simple and inexpensive manner to heat the offgas owing to the distinctly reduced volume flow rate.

In a preferred embodiment of the process according to the invention, the offgas stream during the startup and/or shutdown of the plant is heated prior to the entry thereof into the additional reactor (5), preferably to a temperature of 100 to 600° C., preferably of 150 to 400° C., more preferably of 180 to 300° C., and most preferably of 200 to 270° C.

The heating apparatuses used may be all apparatuses known to those skilled in the art. As well as heating by means of electrically operated heating appliances or by infrared heating, hot gases can also be added to the offgas stream.

The advantage of the process according to the invention is firstly that the nitrogen oxide concentration in the residual gas in the exit of the chimney can be reduced even without the steady-state residual gas cleaning operation to such an extent that it is colorless, and secondly that a lower level of nitrogen oxides is released to the environment. The reduction in the nitrogen oxide concentration in the residual gas in the course of startup and/or shutdown can be regulated manually or automatically.

It will be apparent that the process in the course of shutdown of the plant can be performed only until the entire plant has returned to ambient pressure. Subsequently, no further offgas passes out of the plant.

In the course of restart of the plant, with the onset of air conveying in the machine set, the nitrogen oxide which has remained in the plant at ambient pressure is forced into the atmosphere and becomes visible. In order to reduce the offgas concentration during this operation too, in a further configuration, the offgas from the plant is advantageously passed through additional reactor (5) together with the reducing agent for nitrogen oxides in the course of restart of the plant.

The invention also relates to a nitric acid plant equipped for the performance of the above-described process, comprising at least the elements of:

A) ammonia oxidation,
B) absorption tower (6) for production of nitric acid from the $NO_x$ formed in the ammonia combustion by reaction with water,
C) residual gas cleaning (8) for steady-state operation, which is designed for the removal of nitrogen oxides from the offgas for steady-state operation,
D) residual gas turbine (11), and
E) reactor (5) for reducing the content of nitrogen oxides in the offgas which is present or arises in the nitric acid plant during the startup and/or shutdown thereof, said reactor (5) being designed for the reduction of the content of nitrogen oxides in the offgas during the shutdown and/or startup of the nitric acid plant, and
F) the additional reactor (5) in the flow path of the offgas through the reactor comprises at least one catalyst for reduction of $NO_x$ with a reducing agent or at least one catalyst for reduction of $NO_x$ with a reducing agent and at least one catalyst for reduction of $N_2O$ with a reducing agent and/or a catalyst for decomposition of $N_2O$ to nitrogen and oxygen, and
G) at least one inlet is provided for the introduction of reducing agent (14) for nitrogen oxides into the offgas stream, said inlet opening into the conduit of the offgas stream upstream of entry into the additional reactor (5), viewed in flow direction.

In a preferred embodiment of the inventive plant, a measurement device I) (16) which determines the content of nitrogen oxides, preferably of $NO_x$, in the offgas upstream or downstream of the additional reactor (5) is provided.

In a further preferred embodiment of the inventive plant, a heating device J) (3) is provided, with which the temperature of the offgas can be increased prior to entry thereof into the additional reactor (5).

In a further preferred embodiment of the inventive plant, residual gas turbine E) (11) and additional reactor F) (5) are connected in parallel, and the path of the offgas stream in steady-state operation and in the course of startup and/or shutdown of the plant is controlled by two valves K) (1, 10) arranged in the flow path of the offgas upstream of the residual gas turbine E) (11) and in the flow path of the offgas upstream of the additional reactor F) (5).

In a further preferred embodiment of the inventive plant, a valve L) (4) provided in the inlet H) can be used to control the amount of the reducing agent (14) supplied to the offgas.

The invention is illustrated in detail hereinafter by way of example with reference to the drawing.

FIG. 1 shows a simplified plant scheme of a nitric acid plant with an additional reactor (5).

What is shown is part of a nitric acid plant equipped in accordance with the invention. What is shown is an absorption tower (6) in which nitric acid is produced from $NO_x$ and water. Also shown are a heat exchanger (7) and a residual gas cleaning operation (8) for steady-state operation, which is supplied via a valve (9) with reducing agent for $NO_x$ (13), preferably with ammonia. The offgas which contains nitrogen oxides and leaves the absorption tower (6) passes through heat exchanger (7), residual gas cleaning operation (8), is supplied in steady-state operation through the opened valve (10) to a residual gas turbine (11) and is then discharged from the plant via chimney (12). In steady-state operation, the decompression valve (1) is closed.

In the course of shutdown of the nitric acid plant, the residual gas blocked in is released gradually by means of the decompression valve (1), for example at a volume flow rate of about 1000 $m^3$ (STP)/h. If required, the offgas is then heated to the reaction temperature required for the NO reduction of preferably more than 230° C., more preferably 250° C. and in the optimal case more than 250° C. For this purpose, for example, an electrical heater (3) with power rating typically 80 kW is used. The offgas is supplied to the additional reactor (5). This contains at least one catalyst for the reduction of $NO_x$ by ammonia. The catalyst is preferably in honeycomb form. Also supplied to the additional reactor (5) is ammonia (14). The amount of ammonia is controlled by a regulatable valve (4). The nitrogen oxides present in the offgas are catalytically reduced in the additional reactor (5) and the cleaned offgas stream is supplied to the chimney (12). Likewise shown is a measurement device (16) for the $NO_x$ exit concentration. This measurement can likewise or alternatively be used for regulation of the valve (4) and hence of the amount of ammonia added.

Owing to the materials and catalysts used, the system can be operated up to the maximum design temperature of the nitric acid plant in each case. This ensures that the decompression operation can be commenced immediately after the plant shutdown. If the decompression operation of the nitric acid plant is performed directly after the plant shutdown, it is substantially possible to dispense with heating of the offgas owing to the residual heat available.

The invention claimed is:

1. A method for reducing a nitrogen oxide off-gas concentration during at least one of a start-up or shutdown of a nitric acid manufacturing plant that is operated under pressure and is equipped with a residual gas cleaning first reactor configured to remove nitrogen oxides from off-gas during steady state operation of the plant, the method comprising:
    initiating at least one of the start-up or shutdown of the nitric acid manufacturing plant;
    directing a pressurized off-gas stream, containing nitrogen oxides from the nitrogen oxide plant and gaseous reducing agent for the nitrogen oxides, into a catalyst-filled second reactor configured to reduce the amount of nitrogen oxides in the off-gas during the at least one of the start-up or shutdown of the nitric acid manufacturing plant; and
    reducing the $NO_x$ content in the off-gas by catalytic reduction in the catalyst-filled second reactor.

2. The method of claim 1, further comprising, reducing the $N_2O$ content in the off-gas by at least one of catalytic reduction or catalytic decomposition in the catalyst-filled second reactor.

3. The method of claim 1, wherein ammonia is the gaseous reducing agent for the nitrogen oxides.

4. The method of claim 1, further comprising:
    by a measurement device disposed at least one of upstream or downstream of the second reactor, measuring the content of nitrogen oxides in the off-gas stream during the at least one of the start-up or shutdown of the nitric acid plant; and
    regulating the amount of reducing agent added to the off-gas stream based upon one or more control parameters including at least the measured content of the nitrogen oxide present in the off-gas stream.

5. The method of claim 1, wherein a temperature in the second reactor, during the at least one of the shutdown or start-up of the nitric acid manufacturing plant, is in a range of between about 100° C. to about 600° C.

6. The method of claim 1, wherein said step of directing a pressurized off-gas stream comprises:
    directing, during the at least one of the start-up or shutdown of the nitric acid plant, the pressurized off-gas stream from the nitric acid plant to bypass a residual gas turbine that is used during steady state operation of the nitric acid plant; and
    channeling the pressurized off-gas stream through the catalyst-filled second reactor that is connected in parallel to the residual gas turbine.

7. The method of claim 6, further comprising, after said reducing the $NO_x$ content in the off-gas, sending the pressurized $NO_x$-reduced off-gas stream to a chimney.

8. The method of claim 1, wherein, during the at least one of the start-up or shutdown of the nitric acid plant, a pressure in the catalyst-filled second reactor is between about 0.9 bar to 3.0 bar.

9. The method of claim 1, wherein a space velocity in the catalyst-filled second reactor varies between 2,000 $h^{-1}$ and 200,000 $h^{-1}$.

10. The method of claim 1, further comprising heating the pressurized off-gas stream during the at least one of the start-up or shutdown of the nitric acid plant, prior to the off-gas stream entering the catalyst-filled second reactor.

11. A nitric acid manufacturing system, comprising:
    an ammonia oxidation system configured to produce nitrogen oxides $NO_x$;
    an absorption tower in gaseous communication with said ammonia oxidation system, configured to produce nitric acid by reacting $NO_x$, produced in said ammonia oxidation system, with water, and further configured to generate nitrogen oxide laden off-gas to be channeled to an off-gas stream;

a residual gas cleaning first reactor in gaseous communication with the off-gas stream from said absorption tower, said first reactor being configured to remove nitrogen oxides from the off-gas stream generated during a steady state operation of the nitric acid plant;

a residual gas turbine in gaseous communication with the off-gas stream from said residual gas cleaning first reactor;

a second reactor in gaseous communication with the off-gas stream from said residual gas cleaning first reactor, said second reactor being configured to reduce a content of nitrogen oxides in off-gas that is present or generated during at least one of a start-up or shutdown of the nitric acid manufacturing system, prior to reaching the steady state operation thereof, said second reactor including at least one catalyst disposed therein and configured to reduce the content of $NO_x$ in the off-gas stream by a reaction with a reducing agent; and at least one inlet in communication with the off-gas stream sent from the residual gas cleaning first reactor and disposed upstream of the second reactor in an off-gas flow direction, said inlet being configured to introduce a reducing agent for nitrogen oxides into the off-gas stream prior to entering the second reactor.

12. The nitric acid manufacturing system of claim 11, wherein said second reactor further includes at least one catalyst disposed therein and configured to reduce a content of $N_2O$ in the off-gas stream by a reaction with at least one of a reducing agent or a catalyst for decomposition of $N_2O$ to nitrogen and oxygen.

13. The nitric acid manufacturing system of claim 11, further comprising a measurement device in communication with the off-gas stream and configured to determine a content of nitrogen oxides in the off-gas stream at a location in the off-gas stream that is at least one of upstream or down stream of said second reactor.

14. The nitric acid manufacturing system of claim 11, further comprising a heating device disposed in the off-gas stream and configured to increase the temperature of the off-gas stream prior to entry of the off-gas stream into said second reactor.

15. The nitric acid manufacturing system of claim 11, wherein said residual gas turbine and said second reactor are connected in parallel relative to said off-gas stream, wherein a flow path of the off-gas stream, during each of (a) the steady state operation and (b) the at least one of the start-up or shutdown of the nitric acid manufacturing system, is controlled by a plurality of valves in the flow path of the off-gas stream that are disposed upstream of each of the residual gas turbine and the second reactor.

16. The nitric acid manufacturing system of claim 11, further comprising a reducing agent control valve disposed in said at least one inlet, and configured to control an amount of reducing agent supplied to the off-gas stream.

17. The nitric acid manufacturing system of claim 11, wherein a volume of said second reactor is between about $0.01\ m^3$ to $10\ m^3$.

* * * * *